July 1, 1924.
E. H. ANDERSON
AIR PAN
Filed Jan. 30, 1923  2 Sheets-Sheet 1
1,499,496
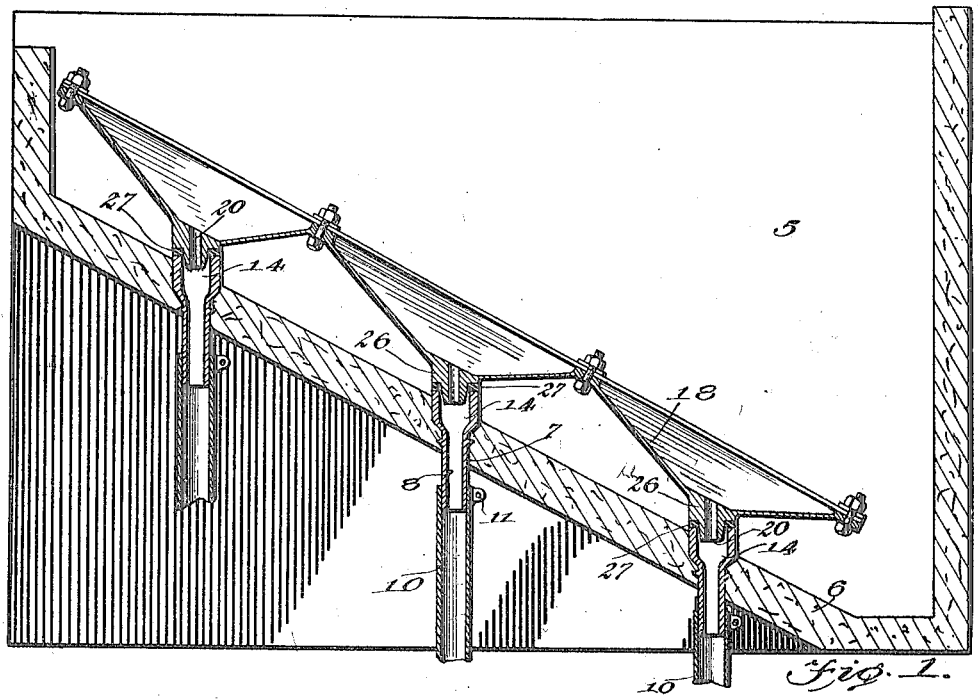
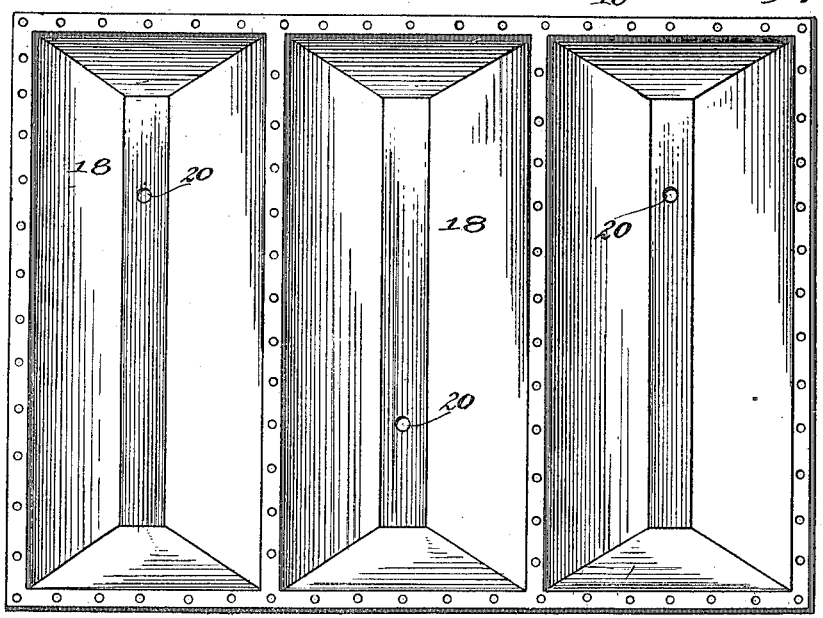
INVENTOR
Eric H. Anderson,
BY
ATTORNEYS

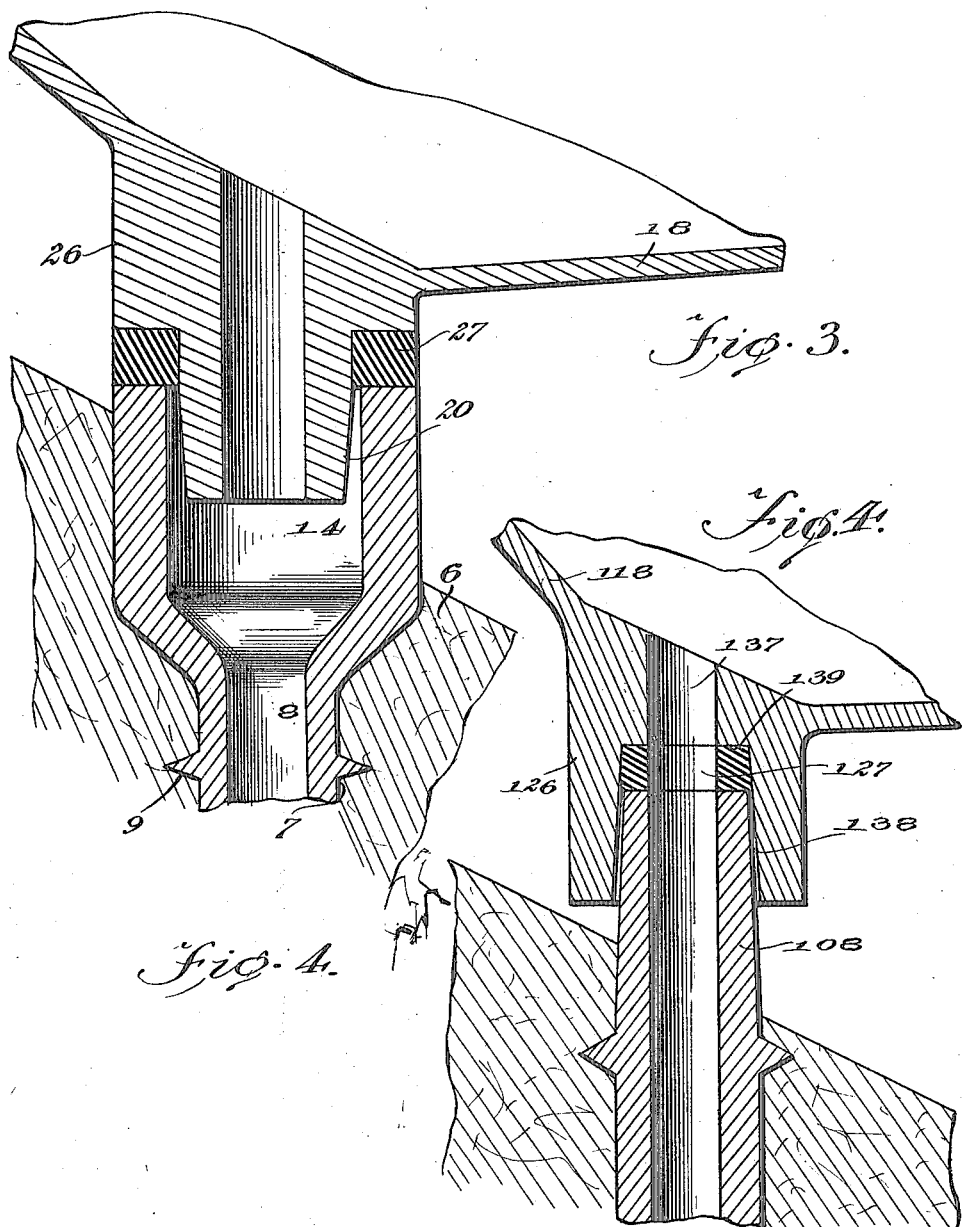

Patented July 1, 1924.

1,499,496

UNITED STATES PATENT OFFICE.

ERIC HERMAN ANDERSON, OF MAGNA, UTAH.

AIR PAN.

Application filed January 30, 1923. Serial No. 615,945.

*To all whom it may concern:*

Be it known that I, ERIC H. ANDERSON, a citizen of the United States, and resident of Magna, in the county of Salt Lake and State of Utah, have invented certain new and useful Improvements in Air Pans, of which the following is a specification.

This invention relates to an improved air pan for use in the flotation process in the separation of minerals and waste.

Briefly stated an important object is to provide simple and reliable means whereby to connect the air pan with the air hose in such a manner that the pan may be readily and conveniently changed and separated from the hose without the necessity of removing the hose with the pan.

A further object is to provide simple means whereby the weight of the pan is uniformly borne by a plurality of spaced gaskets which act as a means to establish an air tight connection between the pan and the several air hose and these gaskets permit the pan to be readily and conveniently removed when desired.

Other objects and advantages of the invention will be apparent during the course of the following description.

In the accompanying drawing, forming a part of this application, and in which like numerals are employed to designate like parts throughout the same, Figure 1 is a section through a cell equipped with the improved air pan and hose sections.

Figure 2 is a plan view of the air pan.

Figure 3 is a detail section through the connecting means of the pan and the hose sections.

Figure 4 is a detail section through a slight modification of the invention.

In the drawing the numeral 5 designates a cell which may be constructed of cement or any other desired material and which is provided with an inclined bottom 6. Of course the bottom 6 may be inclined at any desired angle and is provided with openings 7 for the reception of bushings 8 of bronze or other suitable material and as illustrated in Figure 1 the bushing 8 is formed intermediate its ends with an annular rib 9 by means of which the said bushing is securely anchored in position.

Figure 1 also illustrates that the lower portion of the bushing 8 is extended below the inclined bottom 6 and has connection with an air hose 10 through the medium of a hose clamp 11 of any desired construction. The upper portion of each bushing 8 is flared as indicated at 14.

In accordance with this invention the air pan 18 which is arranged within the cell is provided with spaced nipples 20 which are freely received in the flared portions 14 and which are tapered so that they will freely enter the said flared portions. Figure 2 illustrates that each nipple 20 is formed with an annular enlargement 26 with which the rubber gasket 27 contacts and it will be seen that the gasket 27 which is confined between the bushing 8 and the shoulder 26 provides an air tight connection between the nipple and the bushing 8.

Figures 1 and 2 illustrate that the several nipples 20 are uniformly spaced and therefore the weight of the pan resting upon the several gaskets 27 distributes the pressure and consequently provides an air tight connection between the several bushings 8 and the air pan.

It will be observed that when it is desired to remove the pan it is not necessary to withdraw the hose or disconnect the hose from the pan by the loosening of bolts, nuts or other fastening devices. The pan may be conveniently removed by simply lifting the same up off the gaskets 27 and the bushings 8 and the hose sections 10 will remain in place. When the pan is reapplied the gaskets will provide an air tight connection between the parts and the air may be directed through the nipples 20 in a highly efficient manner and without leakage.

It will be observed that the several bushings 8 are vertically arranged so that horizontal bearing surfaces are presented to the gaskets 27. By reason of this arrangement of parts the weight of the pan 18 will bear directly on the gaskets 27 for compressing the same, whereby an absolutely air tight connection is provided between the parts. By arranging the bushings 8 vertically and slightly increasing the thickness of one side of the shoulder 26 there will be no tendency of the pan to slide downwardly and all of the weight of the pan is borne by the several gaskets 27.

In the modified form of the invention illustrated in Figure 4 the pan is designated by the numeral 118 and is provided with the depending nipple 126 having a bore 137 the lower portion of which is enlarged as indicated at 138 so as to provide an annular shoulder 139 with which a gasket 127 flatly contacts. This figure illustrates that the tapered upper end of the bushing 108 is received within the enlarged portion 138 and flatly contacts with the gasket 127 so as to effectively compress the same and thereby provide an air tight connection between the parts. In this case also the bushing is arranged vertically and the attaching member 126 is so formed that the entire weight of the pan 118 is borne by the gasket 127 and the tendency of the pan to slip is overcome.

When it is desired to remove the pan it is merely lifted off the several gaskets and the several hose sections are allowed to remain stationary thereby facilitating the operation.

With reference to the foregoing description taken in connection with the accompanying drawings, it will be apparent that the floatation process may be carried out in a highly economical and efficient manner as the hose sections may remain in a stationary position and will not have to be frequently removed, which is very expensive and laborious.

In carrying out the invention it is not necessary to have a three compartment air pan with a three point support and a pan of one compartment could be made with a hose connection located at one end and the other end supported on the bottom of the cell but the hose connection, would of course, be the same as with the three compartment pan.

Furthermore the action of gravity in providing a tight connection between the parts could be assisted by bolts and nuts securely holding the pan in position.

With reference to the foregoing description taken in connection with the accompaning drawings, it will be seen that the invention forming the subject matter of this application is capable of a wide variety of mechanical expressions and it is therefore to be understood that the forms of the invention herewith shown and described are to be taken merely as preferred examples of the same and that such minor changes in arrangement and construction of parts may be made as will remain within the spirit of the invention and the scope of what is claimed.

Having thus described the invention, what is claimed is:—

1. An apparatus for use in the floatation process which consists of a cell having a bottom provided with openings, bushings extending through said cell and having their upper portions flared, and an air pan having nipples exteriorly tapered and received within the flared portions of said bushings.

2. An apparatus for the use in the floatation process which consists of a cell having a bottom provided with openings, bushings extending through said cell and having their upper portions flared, a pan having nipples exteriorly tapered and received within the flared portions of said bushings, and gaskets mounted on said bushings and surrounding said nipples, said nipples being provided with annular shoulders engaging said gaskets, said air pans being detachably mounted on said cell and constituting a means to compress the gaskets and thereby provide an air tight connection between the nipples and the bushings.

3. The combination of a cell having a plurality of openings, bushings received in said openings and terminating above the same, an air pan having a plurality of uniformly spaced nipples received in said bushings and formed with shoulders, and gaskets confined between said shoulders and bushings, said pan being adapted to compress the gaskets and therefore provide an air tight connection between the nipples and the bushings.

4. The combination of a cell having a plurality of openings, bushings received in said openings and terminating above the same, an air pan having a plurality of uniformly spaced nipples received in said bushings and having shoulders, and gaskets confined between said shoulders and bushings, said pan being adapted to compress the gaskets and therefore provide an air tight connection between the nipples and the bushings, said bushings being extended below the cell, and hose sections connected to the extended lower terminal portions of said bushings.

5. An apparatus for use in the floatation process which consists of a cell having the bottom wall provided with a series of vertically arranged openings, vertically arranged bushings received in said vertical openings and having their upper portions flared, pans having nipples received in the flared portions of said bushings, said nipples being provided with annular shoulders having horizontal bearing surfaces, and gaskets confined between the bearing surfaces of said shoulders and the upper ends of said bushings, the weight of said pan being adapted to provide an air tight connection between the pan and bushings by the compression of said gaskets.

ERIC HERMAN ANDERSON.